US008814983B2

(12) United States Patent
McAlister

(10) Patent No.: US 8,814,983 B2
(45) Date of Patent: *Aug. 26, 2014

(54) DELIVERY SYSTEMS WITH IN-LINE SELECTIVE EXTRACTION DEVICES AND ASSOCIATED METHODS OF OPERATION

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/682,668

(22) Filed: Nov. 20, 2012

(65) Prior Publication Data

US 2013/0216457 A1 Aug. 22, 2013

Related U.S. Application Data

(60) Division of application No. 13/027,235, filed on Feb. 14, 2011, now Pat. No. 8,313,556, and a continuation-in-part of application No. 12/857,553, (Continued)

(51) Int. Cl.
*B01D 53/22* (2006.01)
*H01M 8/06* (2006.01)

(52) U.S. Cl.
USPC .................. 95/45; 95/55; 95/56; 96/4; 96/9; 96/10; 429/411; 429/416; 423/580.1

(58) Field of Classification Search
USPC .............. 95/45, 47, 54, 55, 56; 96/4, 7, 9, 10; 429/411, 416; 423/580.1
See application file for complete search history.

(56) References Cited

U.S. PATENT DOCUMENTS 2,208,157 A 7/1940 Fritz
2,398,828 A 4/1946 Gray
(Continued)

FOREIGN PATENT DOCUMENTS

CN 101306302 A 11/2008
EP 0485922 11/1991
(Continued)

OTHER PUBLICATIONS

European Search Report for Application EP10814158.1; Date of Mailing Jan. 9, 2014; 11 pages.

(Continued)

*Primary Examiner* — Jason M Greene
(74) *Attorney, Agent, or Firm* — Perkins Coie LLP

(57) ABSTRACT

The present disclosure is directed to a system for delivery of a target material and/or energy. The system includes a source configured to provide a mixture containing the target material and a non-target material, a delivery conduit coupled to the source to receive the mixture from the source, and an in-line extraction device concentric to the delivery conduit. The in-line extraction device is configured to selectively extract the target material and/or energy from the mixture in the delivery conduit and to delivery it to a downstream facility.

14 Claims, 6 Drawing Sheets

Related U.S. Application Data filed on Aug. 16, 2010, and a continuation-in-part of application No. 12/707,651, filed on Feb. 17, 2010, now Pat. No. 8,075,748, said application No. 12/857,553 is a continuation-in-part of application No. PCT/US2010/024497, filed on Feb. 17, 2010, said application No. 12/857,553 is a continuation-in-part of application No. 12/707,653, filed on Feb. 17, 2010, now Pat. No. 8,172,990, and a continuation-in-part of application No. 12/707,656, filed on Feb. 17, 2010, now Pat. No. 8,075,749, application No. 12/857,553, which is a continuation-in-part of application No. PCT/US2010/024499, filed on Feb. 17, 2010, application No. 13/027,235, which is a continuation-in-part of application No. 12/857,541, filed on Aug. 16, 2010, and a continuation-in-part of application No. 12/707,651, and a continuation-in-part of application No. PCT/US2010/024497, and a continuation-in-part of application No. 12/707,653, and a continuation-in-part of application No. 12/707,656, and a continuation-in-part of application No. PCT/US2010/024499, and a continuation-in-part of application No. PCT/US2010/024498, filed on Feb. 17, 2010, said application No. 13/027,235 is a continuation-in-part of application No. 12/857,554, filed on Aug. 16, 2010, and a continuation-in-part of application No. 12/707,651, and a continuation-in-part of application No. PCT/US2010/024497, and a continuation-in-part of application No. 12/707,653, and a continuation-in-part of application No. 12/707,656, and a continuation-in-part of application No. PCT/US2010/024499, and a continuation-in-part of application No. PCT/US2010/024498, said application No. 13/027,235 is a continuation-in-part of application No. 12/857,502, filed on Aug. 16, 2010, and a continuation-in-part of application No. 12/707,651, and a continuation-in-part of application No. PCT/US2010/024497, and a continuation-in-part of application No. 12/707,653, and a continuation-in-part of application No. 12/707,656, and a continuation-in-part of application No. PCT/US2010/024499, and a continuation-in-part of application No. PCT/US2010/024498, said application No. 13/027,235 is a continuation-in-part of application No. 12/857,443, filed on Aug. 16, 2010, and a continuation-in-part of application No. 12/707,651, and a continuation-in-part of application No. PCT/US2010/024497, and a continuation-in-part of application No. 12/707,653, and a continuation-in-part of application No. 12/707,656, and a continuation-in-part of application No. PCT/US2010/024499, and a continuation-in-part of application No. PCT/US2010/024498.

(60) Provisional application No. 61/304,403, filed on Feb. 13, 2010, provisional application No. 61/345,053, filed on May 14, 2010, provisional application No. 61/401,699, filed on Aug. 16, 2010, provisional application No. 61/153,253, filed on Feb. 17, 2009, provisional application No. 61/237,476, filed on Aug. 27, 2009.

(56) References Cited

U.S. PATENT DOCUMENTS

| | | |
|---|---|---|
| 3,888,896 A | 6/1975 | Espino et al. |
| 4,105,755 A | 8/1978 | Darnell et al. |
| 4,124,481 A | 11/1978 | Ramer |
| 4,172,506 A | 10/1979 | Terry |
| 4,200,505 A | 4/1980 | Day et al. |
| 4,319,635 A | 3/1982 | Jones |
| 4,341,607 A | 7/1982 | Tison |
| 4,341,608 A | 7/1982 | St. John |
| 4,382,189 A | 5/1983 | Wilson |
| 4,386,801 A | 6/1983 | Chapman et al. |
| 4,389,288 A | 6/1983 | Vaughan |
| 4,395,316 A | 7/1983 | St. John |
| 4,437,954 A | 3/1984 | Sammells et al. |
| 4,455,045 A | 6/1984 | Wheeler |
| 4,468,235 A * | 8/1984 | Hill .................... 95/56 |
| 4,601,508 A | 7/1986 | Kerian |
| 4,611,847 A | 9/1986 | Sullivan |
| 4,620,900 A | 11/1986 | Kimura et al. |
| 4,736,111 A | 4/1988 | Linden |
| 4,746,160 A | 5/1988 | Wiesemeyer |
| 4,896,507 A | 1/1990 | Hosford |
| 4,902,307 A * | 2/1990 | Gavalas et al. .............. 95/55 |
| 4,978,162 A | 12/1990 | Labbe |
| 4,985,055 A | 1/1991 | Thorne et al. |
| 5,024,818 A | 6/1991 | Tibbetts et al. |
| 5,058,945 A | 10/1991 | Elliott, Sr. et al. |
| 5,119,897 A | 6/1992 | Moriwake |
| 5,132,007 A | 7/1992 | Meyer et al. |
| 5,222,698 A | 6/1993 | Nelson et al. |
| 5,259,870 A * | 11/1993 | Edlund .................. 95/56 |
| 5,280,990 A | 1/1994 | Rinard |
| 5,323,061 A | 6/1994 | Immler et al. |
| 5,343,699 A | 9/1994 | McAlister |
| 5,407,245 A | 4/1995 | Geropp |
| 5,498,059 A | 3/1996 | Switlik |
| 5,560,443 A | 10/1996 | DuBose |
| 5,617,504 A | 4/1997 | Sciacca et al. |
| 5,662,389 A | 9/1997 | Truglio et al. |
| 5,719,990 A | 2/1998 | Yang |
| 5,806,553 A | 9/1998 | Sidwell |
| 5,986,429 A | 11/1999 | Mula, Jr. |
| 6,015,065 A | 1/2000 | McAlister |
| 6,068,328 A | 5/2000 | Gazdzinski |
| 6,081,183 A | 6/2000 | Mading et al. |
| 6,083,377 A | 7/2000 | Lin et al. |
| 6,090,266 A | 7/2000 | Roychowdhury |
| 6,092,861 A | 7/2000 | Whelan |
| 6,155,212 A | 12/2000 | McAlister |
| 6,200,069 B1 | 3/2001 | Miller |
| 6,216,599 B1 | 4/2001 | Cavanagh |
| 6,220,193 B1 | 4/2001 | Dilks |
| 6,309,010 B1 | 10/2001 | Whitten |
| 6,378,932 B1 | 4/2002 | Fasel et al. |
| 6,402,810 B1 | 6/2002 | Mayer et al. |
| 6,409,252 B1 | 6/2002 | Andrus |
| 6,446,597 B1 | 9/2002 | McAlister |
| 6,468,684 B1 * | 10/2002 | Chisholm et al. ............... 95/55 |
| 6,500,313 B2 | 12/2002 | Sherwood |
| 6,502,533 B1 | 1/2003 | Meacham |
| 6,503,584 B1 | 1/2003 | McAlister |
| 6,516,754 B2 | 2/2003 | Chadwick |
| 6,525,431 B1 | 2/2003 | Clucas et al. |
| 6,606,860 B2 | 8/2003 | Chadwick |
| 6,749,043 B2 | 6/2004 | Brown et al. |
| 6,755,899 B2 | 6/2004 | Nagai |
| 6,756,140 B1 | 6/2004 | McAlister |
| 6,757,591 B2 | 6/2004 | Kramer |
| 6,783,750 B2 | 8/2004 | Shah et al. |
| 6,784,562 B2 | 8/2004 | Gennesseaux |
| 6,838,782 B2 | 1/2005 | Vu |
| 6,854,788 B1 | 2/2005 | Graham |
| 6,897,575 B1 | 5/2005 | Yu |
| 6,926,345 B2 | 8/2005 | Ortega et al. |
| 6,979,049 B2 | 12/2005 | Ortega et al. |
| 6,984,305 B2 | 1/2006 | McAlister |
| 7,062,913 B2 | 6/2006 | Christensen et al. |
| 7,152,908 B2 | 12/2006 | Shahbazi |
| 7,165,804 B2 | 1/2007 | Shahbazi |
| 7,185,944 B2 | 3/2007 | Shahbazi |
| 7,207,620 B2 | 4/2007 | Cosgrove et al. |
| 7,210,467 B2 | 5/2007 | Kweon et al |
| 7,211,905 B1 | 5/2007 | McDavid, Jr. |
| 7,237,827 B2 | 7/2007 | Shahbazi |
| 7,243,980 B2 | 7/2007 | Vala |

(56) References Cited

U.S. PATENT DOCUMENTS

| | | |
|---|---|---|
| 7,254,944 B1 | 8/2007 | Goetzinger et al. |
| 7,314,502 B2 | 1/2008 | Kelley |
| 7,364,810 B2 | 4/2008 | Sridhar et al. |
| 7,427,189 B2 | 9/2008 | Eyb et al. |
| 7,448,214 B2 | 11/2008 | Monostory et al. |
| 7,592,383 B2 | 9/2009 | Fukui |
| 7,632,338 B2 | 12/2009 | Cipollini |
| 7,797,183 B2 | 9/2010 | Dias et al. |
| 7,827,974 B2 | 11/2010 | Beckmann |
| 7,931,784 B2 | 4/2011 | Medoff |
| 7,938,940 B2 | 5/2011 | Kawahara et al. |
| 8,071,241 B2 | 12/2011 | Sridhar et al. |
| 8,165,968 B2 | 4/2012 | Ramesh et al. |
| 8,187,549 B2 | 5/2012 | McAlister |
| 8,187,550 B2 | 5/2012 | McAlister |
| 8,313,556 B2 * | 11/2012 | McAlister ........................ 95/55 |
| 8,595,020 B2 | 11/2013 | Marino |
| 2001/0035093 A1 | 11/2001 | Yokota |
| 2002/0007845 A1 | 1/2002 | Collette et al. |
| 2003/0012985 A1 | 1/2003 | McAlister |
| 2003/0018487 A1 | 1/2003 | Young et al. |
| 2003/0062270 A1 | 4/2003 | McAlister |
| 2004/0089439 A1 | 5/2004 | Treverton et al. |
| 2004/0124095 A1 | 7/2004 | Fujimura et al. |
| 2004/0126632 A1 | 7/2004 | Pearson et al. |
| 2005/0003247 A1 | 1/2005 | Pham |
| 2005/0015287 A1 | 1/2005 | Beaver |
| 2006/0005738 A1 | 1/2006 | Kumar |
| 2006/0005739 A1 | 1/2006 | Kumar |
| 2006/0048770 A1 | 3/2006 | Meksvanh et al. |
| 2006/0049063 A1 | 3/2006 | Murphy et al. |
| 2006/0100897 A1 | 5/2006 | Halloran et al. |
| 2006/0257310 A1 | 11/2006 | Tada et al. |
| 2006/0286518 A1 | 12/2006 | Yoder |
| 2007/0138006 A1 | 6/2007 | Oakes et al. |
| 2008/0050800 A1 | 2/2008 | McKeeman et al. |
| 2008/0088135 A1 | 4/2008 | Novo Vidal et al. |
| 2008/0102329 A1 | 5/2008 | Hollinger |
| 2008/0115415 A1 | 5/2008 | Agrawal et al. |
| 2008/0138675 A1 | 6/2008 | Jang et al. |
| 2008/0245672 A1 | 10/2008 | Little et al. |
| 2008/0303348 A1 | 12/2008 | Witters |
| 2009/0016948 A1 | 1/2009 | Young |
| 2009/0169452 A1 | 7/2009 | Constantz et al. |
| 2009/0215137 A1 | 8/2009 | Hawkins et al. |
| 2009/0217584 A1 | 9/2009 | Raman et al. |
| 2009/0222307 A1 | 9/2009 | Beaver |
| 2009/0235587 A1 | 9/2009 | Hawkes et al. |
| 2009/0263540 A1 | 10/2009 | Allen et al. |
| 2009/0266075 A1 | 10/2009 | Westmeier et al. |
| 2009/0276265 A1 | 11/2009 | Shahid et al. |
| 2010/0101231 A1 | 4/2010 | Westmeier |
| 2010/0107994 A1 | 5/2010 | Moriarty et al. |
| 2010/0306002 A1 | 12/2010 | Dias et al. |
| 2011/0041784 A1 | 2/2011 | McAlister |
| 2011/0061295 A1 | 3/2011 | McAlister |
| 2011/0070510 A1 | 3/2011 | McAlister |
| 2011/0081586 A1 | 4/2011 | McAlister |
| 2011/0198211 A1 | 8/2011 | McAlister |
| 2011/0230573 A1 | 9/2011 | McAlister |
| 2012/0271677 A1 | 10/2012 | Rhodes, III |
| 2012/0323619 A1 | 12/2012 | Risz et al. |

FOREIGN PATENT DOCUMENTS

| | | |
|---|---|---|
| EP | 2103682 A1 | 9/2009 |
| GB | 2 248 230 B | 7/1994 |
| JP | 04-076211 A | 3/1992 |
| JP | 05-223268 A | 8/1993 |
| JP | 07-113567 A | 5/1995 |
| JP | 2000-205044 A | 7/2000 |
| JP | 2000-297700 A | 10/2000 |
| JP | 2002-119822 A | 4/2002 |
| JP | 2005200252 A | 7/2005 |
| JP | 2006-128006 A | 5/2006 |
| JP | 4357969 B2 | 11/2009 |
| KR | 10-0808736 B1 | 2/2008 |
| KR | 10090119098 | 11/2009 |
| WO | WO-01-56938 A1 | 8/2001 |
| WO | WO-2006119118 A2 | 11/2006 |
| WO | WO-2006-136860 A1 | 12/2006 |
| WO | WO-2008-115933 A1 | 9/2008 |

OTHER PUBLICATIONS

Enviromental Input-Output Assessment of Integrated Second Generation Biofuel Production in Fenno-Scandinavia.

Environmentally Smart Accounting Using Total Cost Assessment to advance Pollution Prevention, http://infohouse.p2ric.org/ref/31/30606.pdf.

Full Cost Accounting; "A Course Module on Incorporating Environmental and Social Costs into Traditional Business Accounting Systems," http://gdi.ce.cmu.edu/gd/education/FCA_Module_98.pdf.

Management's Discussion and Analysis—Yamana Gold for the Year Ended Dec. 31,2009, http://www.yamana.com/Theme/Yamana/files/Yamana%20Gold%20Inc%202009%20MD&A%20and%20FS.pdf.

Repurposing Equipment; Cutting Costs, http://www.businessknowledgesource.com/manufacturing/repurposing_equipment_cutting_costs_028706.html.

Supplemental European Search Report for Application EP11742996.9; Applicant McAlister Technologies. LLC.; Date of Mailing Jan. 1, 2014. pp. 1-14.

"Features." Accessed: Aug. 12, 2010. <http://www.pre.nl/simapro/simapro_lca_software.htm>. pp. 1-7.

"GaBi Software: Results and Interpretation." Accessed: Aug. 12, 2010. <http://www.gabi-software.com/software/gabi-4/results-and-interpretation/>. p. 1.

California Clean Air Conversions, LLC. Advanced Green Innovations, LLC. "Meeting California's 2010 Vision: Renewable Hydrogen Production and Fleet Conversion" 2010. p. 1.

Fernando, Vincent. "Exxon: Here's Why We Just Spent $41 Billlion on Natural Gas." Business Insider. Published: Dec. 14, 2009. Web. <http://www.businessinsider.com/exxon-heres-why-we-just-spent-41-billion-on-natural-gas-2009-12>. pp. 1-8.

Holdren, John P. "Meeting the Climate-Change Challenge." Lecture Slides. The John H. Chafee Memorial Lecture. Washington DC. Jan. 17, 2008. pp. 1-52.

International Maritime Organization. "Prevention of Air Pollution from Ships." Marine Environment Protection Committee. 59th Session, Agenda Item 4. Apr. 9, 2009. pp. 1-289.

International Search Report and Written Opinion for Application No. PCT/US11/024813; Applicant: McAlister Technologies, LLC; Date of Mailing: Nov. 30, 2011. pp. 1-12.

McAlister, Roy. "Maximizing Renewable Energy Efficiencies: A Full Spectrum Approach." Feb. 2009. pp. 1-21.

McAlister, Roy. "Sustainable Hydrogen Hyway." California Clean Air Conversions, LLC. Advanced Green Innovations, LLC. 2010. pp. 1-6.

Murray, Don. "World Energy Park." Starpoint Solar. Presentation. Accessed: Jun. 4, 2009. pp. 1-33.

Non-Final Office Action for U.S. Appl. No. 12/857,554; Applicant: McAlister Technologies, LLC.; Date of Mailing: Nov. 21, 2011. pp. 1-30.

Zhang et al., "Economic Modelling Approaches to Cost Estimates for the Control of Carbon Dioxide Emissions," Energy Economics, 1998, vol. 20, pp. 101-120.

* cited by examiner

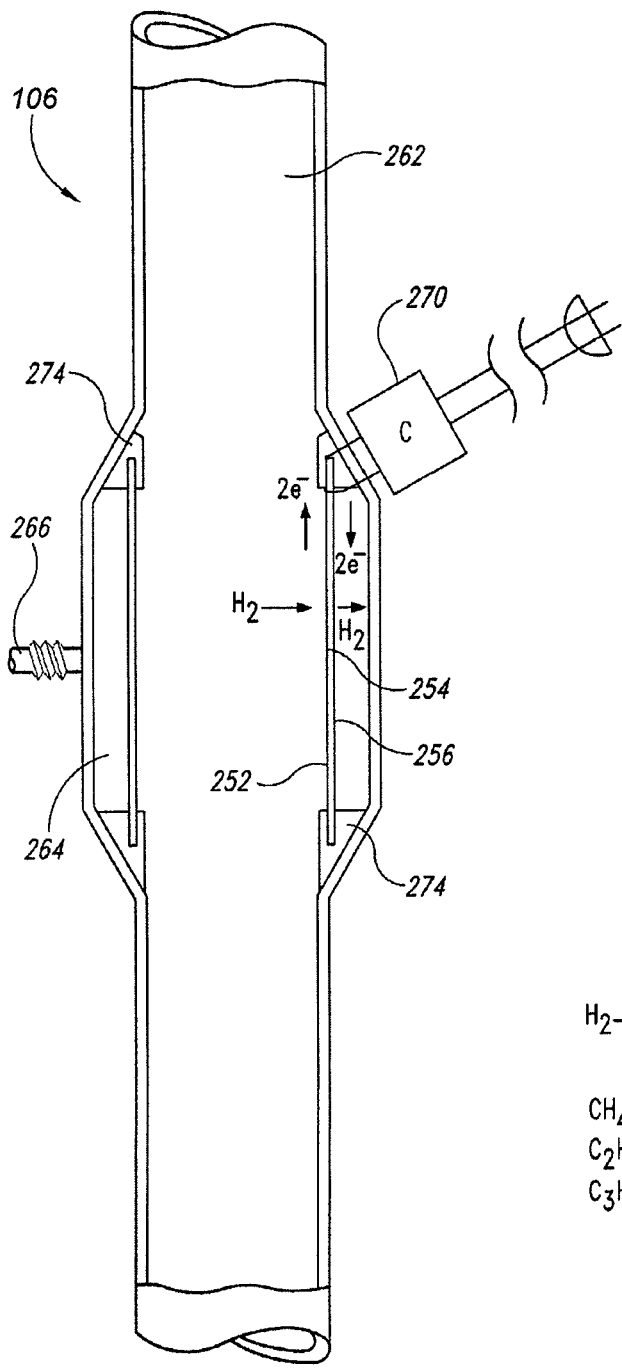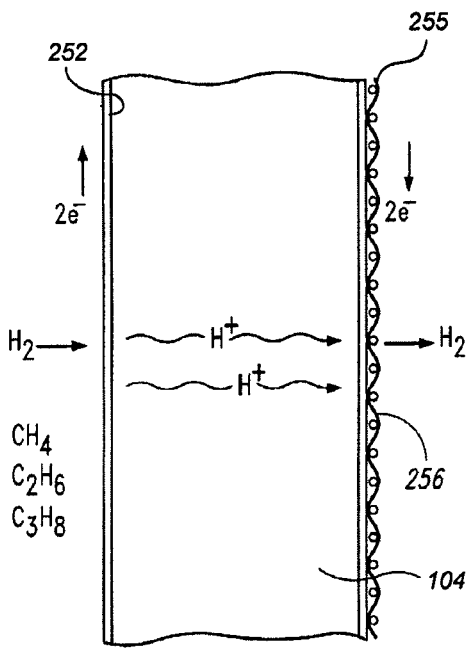
*FIG. 2*
*FIG. 3*

DELIVERY SYSTEMS WITH IN-LINE SELECTIVE EXTRACTION DEVICES AND ASSOCIATED METHODS OF OPERATION

CROSS-REFERENCE TO RELATED APPLICATION(S)

This application is a divisional application of U.S. patent application Ser. No. 13/027,235, filed on Feb. 14, 2011, which claims priority to and the benefit of U.S. Patent Application No. 61/304,403, filed on Feb. 13, 2010 and titled FULL SPECTRUM ENERGY AND RESOURCE INDEPENDENCE; U.S. Patent Application No. 61/345,053 filed on May 14, 2010 and titled SYSTEM AND METHOD FOR RENEWABLE RESOURCE PRODUCTION; and U.S. Patent Application No. 61/401,699, filed on Aug. 16, 2010 and titled COMPREHENSIVE COST MODELING OF AUTOGENOUS SYSTEMS AND PROCESSES FOR THE PRODUCTION OF ENERGY, MATERIAL RESOURCES AND NUTRIENT REGIMES. The present application is a continuation in part of: U.S. patent application Ser. No. 12/857,553, filed on Aug. 16, 2010 and titled SUSTAINABLE ECONOMIC DEVELOPMENT THROUGH INTEGRATED PRODUCTION OF RENEWABLE ENERGY, MATERIALS RESOURCES, AND NUTRIENT REGIMES, which claims priority to and the benefit of U.S. Provisional Patent Application No. 61/345,053 filed on May 14, 2010 and titled SYSTEM AND METHOD FOR RENEWABLE RESOURCE PRODUCTION and U.S. Provisional Application No. 61/304,403, filed Feb. 13, 2010 and titled FULL SPECTRUM ENERGY AND RESOURCE INDEPENDENCE. U.S. patent application Ser. No. 12/857,553 is also a continuation-in-part of each of the following applications: U.S. patent application Ser. No. 12/707,651, filed Feb. 17, 2010 and titled ELECTROLYTIC CELL AND METHOD OF USE THEREOF; PCT Application No. PCT/US10/24497, filed Feb. 17, 2010 and titled ELECTROLYTIC CELL AND METHOD OF USE THEREOF; U.S. patent application Ser. No. 12/707,653, filed Feb. 17, 2010 and titled APPARATUS AND METHOD FOR CONTROLLING NUCLEATION DURING ELECTROLYSIS; PCT Application No. PCT/US10/24498, filed Feb. 17, 2010 and titled APPARATUS AND METHOD FOR CONTROLLING NUCLEATION DURING ELECTROLYSIS; U.S. patent application Ser. No. 12/707,656, filed Feb. 17, 2010 and titled APPARATUS AND METHOD FOR GAS CAPTURE DURING ELECTROLYSIS; and PCT Application No. PCT/US10/24499, filed Feb. 17, 2010 and titled APPARATUS AND METHOD FOR CONTROLLING NUCLEATION DURING ELECTROLYSIS; each of which claims priority to and the benefit of the following applications: U.S. Provisional Patent Application No. 61/153,253, filed Feb. 17, 2009 and titled FULL SPECTRUM ENERGY; U.S. Provisional Patent Application No. 61/237,476, filed Aug. 27, 2009 and titled ELECTROLYZER AND ENERGY INDEPENDENCE TECHNOLOGIES; U.S. Provisional Application No. 61/304,403, filed Feb. 13, 2010 and titled FULL SPECTRUM ENERGY AND RESOURCE INDEPENDENCE. U.S. patent application Ser. No. 13/027,235, filed Feb. 14, 2011 and titled DELIVERY SYSTEMS WITH IN-LINE SELECTIVE EXTRACTION DEVICES AND ASSOCIATED METHODS OF OPERATION is also a continuation in part of U.S. patent application Ser. No. 12/857,541, filed on Aug. 16, 2010 and titled SYSTEMS AND METHODS FOR SUSTAINABLE ECONOMIC DEVELOPMENT THROUGH INTEGRATED FULL SPECTRUM PRODUCTION OF RENEWABLE ENERGY; U.S. patent application Ser. No. 12/857,554, filed on Aug. 16, 2010 and titled SYSTEMS AND METHODS FOR SUSTAINABLE ECONOMIC DEVELOPMENT THROUGH INTEGRATED FULL SPECTRUM PRODUCTION OF RENEWABLE MATERIAL RESOURCES USING SOLAR THERMAL; U.S. patent application Ser. No. 12/857,502, filed on Aug. 16, 2010 and titled ENERGY SYSTEM FOR DWELLING SUPPORT; and U.S. patent application Ser. No. 12/857,433, filed on Aug. 16, 2010 and titled ENERGY CONVERSION ASSEMBLIES AND ASSOCIATED METHODS OF USE AND MANUFACTURE, each of which claims priority to and the benefit of U.S. Provisional Application No. 61/304,403, filed Feb. 13, 2010 and titled FULL SPECTRUM ENERGY AND RESOURCE INDEPENDENCE: U.S. patent application Ser. No. 12/857,541, U.S. patent application Ser. No. 12/857,554. U.S. patent application Ser. No. 12/857,502, and U.S. patent application Ser. No. 12/857,433 are also each a continuation-in-part of each of the following applications: U.S. patent application Ser. No. 12/707,651, filed Feb. 17, 2010 and titled ELECTROLYTIC CELL AND METHOD OF USE THEREOF; PCT Application No. PCT/US10/24497, filed Feb. 17, 2010 and titled ELECTROLYTIC CELL AND METHOD OF USE THEREOF; U.S. patent application Ser. No. 12/707,653, filed Feb. 17, 2010 and titled APPARATUS AND METHOD FOR CONTROLLING NUCLEATION DURING ELECTROLYSIS; PCT Application No. PCT/US10/24498, filed Feb. 17, 2010 and titled APPARATUS AND METHOD FOR CONTROLLING NUCLEATION DURING ELECTROLYSIS; U.S. patent application Ser. No. 12/707,656, filed Feb. 17, 2010 and titled APPARATUS AND METHOD FOR GAS CAPTURE DURING ELECTROLYSIS; and PCT Application No. PCT/US10/24499, filed Feb. 17, 2010 and titled APPARATUS AND METHOD FOR CONTROLLING NUCLEATION DURING ELECTROLYSIS; each of which claims priority to and the benefit of the following applications: U.S. Provisional Patent Application No. 61/153,253, filed Feb. 17, 2009 and titled FULL SPECTRUM ENERGY; U.S. Provisional Patent Application No. 61/237,476, filed Aug. 27, 2009 and titled ELECTROLYZER AND ENERGY INDEPENDENCE TECHNOLOGIES; U.S. Provisional Application No. 61/304,403, filed Feb. 13, 2010 and titled FULL SPECTRUM ENERGY AND RESOURCE INDEPENDENCE. Each of these applications is incorporated herein by reference in its entirety. To the extent the foregoing application and/or any other materials incorporated herein by reference conflict with the disclosure presented herein, the disclosure herein controls.

TECHNICAL FIELD

The present disclosure is related generally to chemical and/or energy delivery systems with in-line selective extraction devices and associated methods of operation.

BACKGROUND

Currently, industrial gases (e.g., oxygen, nitrogen, hydrogen, etc.) and/or other chemical feedstocks are typically separated in distillation and/or other processing facilities and supplied to various users via separate pipelines or cylinders carried by trucks. For example, a methane reforming facility typically receives methane ($CH_4$) through a natural gas pipeline and receives other reactants (e.g., hydrogen ($H_2$), carbon dioxide ($CO_2$), etc.) in separate cylinders by trucks.

The foregoing delivery system can be inefficient and expensive to operate. For example, separation of the chemical reactants typically involves absorption, adsorption, cryogenic distillation, and/or other techniques that have high capital costs and are energy-intensive. Also, construction and maintenance of pipelines as well as separate delivery of chemicals in cylinders can be expensive and time-consuming. Accordingly, several improvements in efficient and cost-effective chemical delivery systems and devices may be desirable.

BRIEF DESCRIPTION OF THE DRAWINGS

FIG. 2 is a schematic cross-sectional view of an in-line extraction device suitable for use in the delivery system of FIG. 1 in accordance with aspects of the technology.

FIG. 3 is an enlarged view of a portion of the in-line extraction device in FIG. 2.

DETAILED DESCRIPTION

Various embodiments of chemical and/or energy delivery systems with in-line selective extraction devices and associated methods of operation are described below. Many of the details, dimensions, angles, shapes, and other features shown in the Figures are merely illustrative of particular embodiments of the technology. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
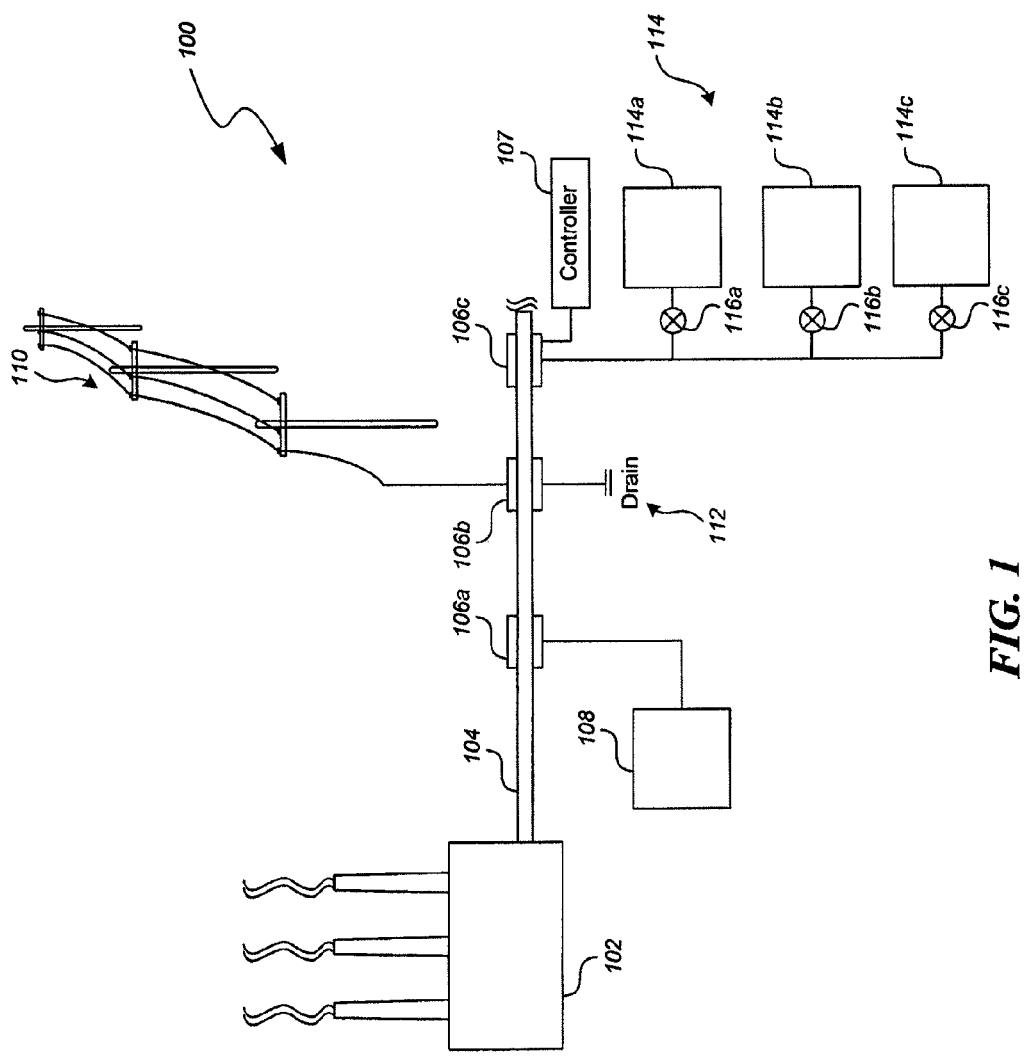
FIG. 1 is a schematic diagram of a delivery system in accordance with aspects of the technology.

FIG. 1 is a schematic diagram of a delivery system 100 in accordance with aspects of the technology. As shown in FIG. 1, the delivery system 100 includes a source 102, a delivery conduit 104 (e.g., a section of pipe) coupled to the source 102, at least one in-line extraction device 106 (three are shown for illustration purposes and identified individually as 106a-106c), and a plurality of downstream facilities 108, 110, and 114 (three downstream facilities are shown for illustration purposes and identified individually as 114a-114c) coupled to the in-line extraction devices 106. Although the delivery system 100 is shown in FIG. 1 with the foregoing particular components, in other embodiments, the delivery system 100 can also include valves, compressors, fans, composition analyzers, and/or other suitable components.

The source 102 can be configured to produce and supply a mixture of chemicals to the delivery conduit 104. In one embodiment, the source 102 can include a natural gas facility that provides methane ($CH_4$), ethane ($C_2H_6$), propane ($C_3H_8$), and/or other suitable alkanes, alkenes, or alkynes to the delivery conduit 104. In another embodiment, the source 102 can include a pyrolysis facility configured to convert a biomass (e.g., wood) into a synthetic natural gas containing hydrogen ($H_2$), carbon monoxide (CO), and carbon dioxide ($CO_2$). In further embodiments, the source 102 can also include other suitable facilities that produce and supply hydrogen sulfide ($H_2S$), water ($H_2O$), and/or other suitable compositions.

The in-line extraction devices 106 can be configured to selectively extract, separate, and/or otherwise obtain a chemical composition from the mixture of chemicals supplied by the source 102. The extracted chemical composition can then be supplied to the corresponding downstream facilities 108, 110, and 114 for further processing. In certain embodiments, the extracted chemical composition can include at least one of methane ($CH_4$), ethane ($C_2H_6$), propane ($C_3H_8$), hydrogen ($H_2$), water ($H_2O$), carbon monoxide (CO), carbon dioxide ($CO_2$), nitrogen ($N_2$), oxygen ($O_2$), argon (Ar), hydrogen sulfide ($H_2S$), and/or other suitable gaseous compositions. In other embodiments, the extracted chemical composition can also include gasoline, diesel, and/or other suitable liquid phase compositions. In further embodiments, the extracted chemical composition can include a combination of gas and liquid phase compositions.

In one embodiment, the in-line extraction devices 106 can be configured to extract hydrogen ($H_2$) from the mixture in the delivery conduit 104 that contains methane ($CH_4$), ethane ($C_2H_6$), propane ($C_3H_8$), and hydrogen ($H_2$). For example, the first in-line extraction device 106a can include a filter that extracts hydrogen ($H_2$). The extracted hydrogen ($H_2$) can then be supplied to the downstream facility 108 and used, for example, for atomic absorption spectral photography, used as a carrier gas in chromatography, reacted with carbon dioxide ($CO_2$) to form methanol ($CH_3OH$), reacted with nitrogen ($N_2$) to form ammonia ($NH_3$), used to power a fuel cell or an internal combustion engine, and/or used for other suitable purposes. In another embodiment, the first in-line extraction device 106a can be configured to extract water ($H_2O$) as steam, liquid water, or ice. One example of the in-line extraction devices 106 is described below in more detail with reference to FIGS. 2 and 3.

In another embodiment, the in-line extraction devices 106 can be configured to extract energy from the mixture in the delivery conduit 104 as electricity, heat, and/or other forms of energy. For example, in the illustrated embodiment, the second in-line extraction device 106b can include a fuel cell (not shown) that can convert hydrogen ($H_2$) in the mixture into electricity and water with external oxygen and/or with oxygen contained in the mixture. The electricity can be supplied to the downstream facility 110 (e.g., a power grid) and the water collected in a drain 112. The collected water may be used for steam generation and/or other suitable purposes.

Figure 7:
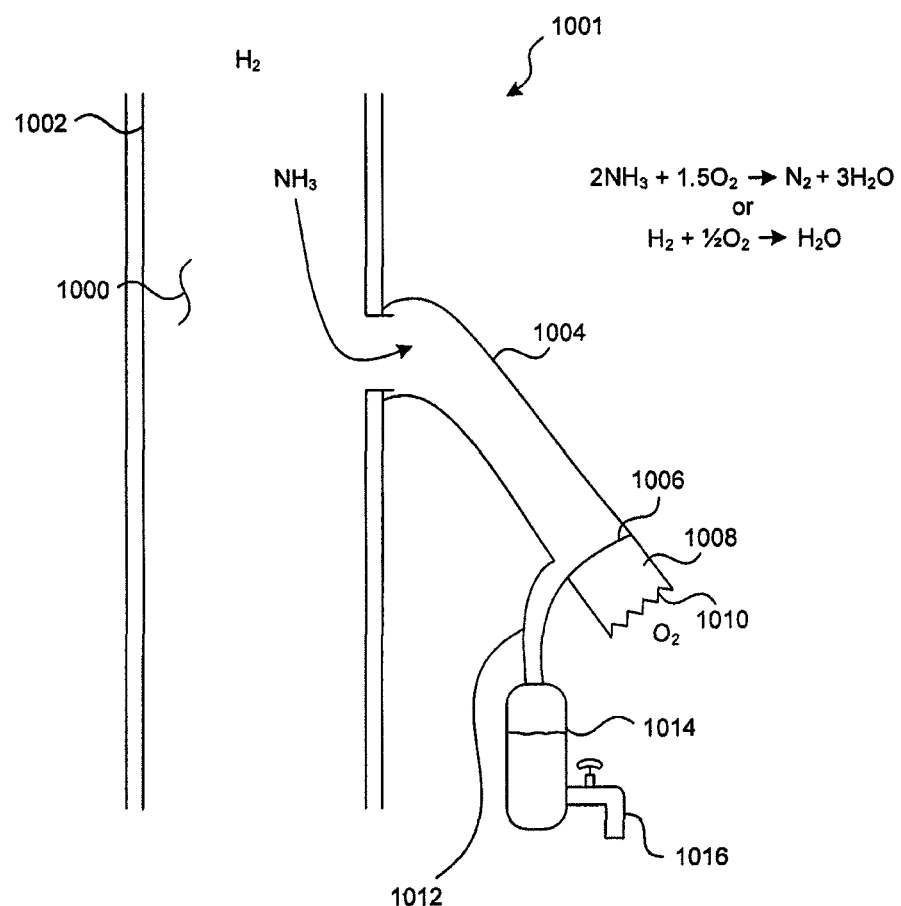
FIG. 7 is a schematic cross-sectional view of an in-line extraction device in accordance with aspects of the technology.

In another embodiment, an appropriate inline filter such as a low temperature semipermeable membrane or a high temperature oxygen ion transport membrane such as a zirconia solid solution transports oxygen ions in a fuel cell system to react with a fuel 1000 from pipeline 1002 such as hydrogen, ammonia, or a hydrocarbon to produce electricity and/or water and/or carbon dioxide. A fuel cell system 1001 such as shown in FIG. 7 provides an oxygen ionization electrode 1010, an oxygen ion transport membrane 1008 and a fuel electrode. Electricity is provided to an external circuit between electrode 1006 and 1010. In instances that the fuel selection produces water it may be collected for various useful applications by fluid passageways 1004,1012 and/or accumulator 1014 and dispensed by valve 1016 as shown. In instances that the fuel selection produces more moles of product than the moles of reactants it may be utilized to pressurize a portion of the fuel cell and has applications as disclosed in U.S. patent application Ser. No. 13/027,188, entitled "METHODS, DEVICES, AND SYSTEMS FOR DETECTING PROPERTIES OF TARGET SAMPLES," filed Feb. 14, 2011, concurrently herewith, the disclosure of which is incorporated herein by reference in its entirety.

In further embodiments, the in-line extraction devices 106 can also include a controller configured to (1) select an extraction target material; (2) adjust a rate of extraction of the extraction target material; and/or (3) control a characteristic (e.g., pressure, temperature, etc.) of the extraction target material, e.g., by using a metering system. For example, the third in-line extraction device 106c is operatively coupled to a controller 107 (e.g., a computer with a non-transitory computer-readable medium) and the plurality of downstream facilities 114. The non-transitory computer-readable medium of the controller 107 can contain instructions that accept an input of an extraction target material from at least one of the downstream facilities 114, adjust an operation characteristic of the third in-line extraction device 106c, and provide the extraction target material to a corresponding downstream facility 114 by switching appropriate valves 116a-116c. In other embodiments, the non-transitory computer-readable medium can also include other suitable instructions for controlling the operation of the third in-line extraction device 106c.

One characteristic of the delivery system 100 is that the mixture produced by the source 102 is not separated before being supplied to the delivery conduit 104. Instead, various compositions are extracted in-line from the mixture before being supplied to the downstream facilities 108, 110, and 114. As a result, a central separation facility is eliminated, and the various compositions of the mixture can share one delivery conduit 104, thus reducing capital investment and operating costs compared to conventional techniques.

Embodiments of the delivery system 100 can also be more flexible than conventional techniques for supplying different compositions to a particular downstream facility. For example, in accordance with conventional techniques, if a downstream facility requires a new composition, then a new pipeline may need to be constructed, requiring substantial capital investment and production delay. In contrast, embodiments of the delivery system 100 can readily extract different compositions because the delivery conduit 104 can deliver a wide spectrum of compositions.

Further, existing natural gas storage and distribution systems can be improved by addition of hydrogen produced from surplus electricity and/or other forms of surplus energy and selective separation systems for removal of hydrogen from other ingredients typically conveyed by the natural gas systems. Hydrogen can be supplied at increased pressure compared to the pressure of delivery to the separation systems by application of selective ion filtration technology, pressure swing adsorption coupled with a compressor, temperature swing adsorption coupled with a compressor, and diffusion coupled with a compressor.

FIG. 2 is a schematic cross-sectional view of an in-line extraction device 106 suitable for use in the delivery system 100 of FIG. 1 in accordance with aspects of the technology. FIG. 3 is an enlarged view of a portion of the in-line extraction device 106 in FIG. 2. Referring to FIGS. 2 and 3 together, in the illustrated embodiment, the in-line extraction device 106 includes a coaxial filter 254 concentrically positioned in the delivery conduit 104. Insulator seals 274 support and isolate the filter 254. The coaxial filter 254 includes conductive reinforcement materials 255 on the outside diameter as shown in FIG. 3 as a magnified section.

The filter 254 is configured to selectively extract a target material from the mixture in the delivery conduit 104. In the following description, hydrogen extraction is used as an example to illustrate the selective extraction technique, though other compositions may also be extracted with generally similar or different techniques. In the illustrated embodiment, the filter 254 can allow hydrogen to pass through the filter 254 from a first or interior surface 252 to a second or exterior surface 256. In certain embodiments, the filter 254 can be an electrolyzer that is positioned inline with a conduit 262 and that includes corresponding electrodes at the first and second surfaces 252 and 256. In other embodiments, if the extraction target material (e.g., hydrogen) is reacted (e.g., via oxidation with oxygen), the filter 254 may also include a catalyst coated on and/or embedded in the filter 254. For example, in the example of oxidizing hydrogen to produce electricity and water, palladium and alloys of palladium such as silver-palladium and/or other suitable catalysts may be provided in the filter 254.

Filters or membranes suitable for such filtering can include molecular sieves, semi-permeable polymer membranes, hybrid sieve/membranes, capillary structures, and/or a combination thereof. For example, in one embodiment, the filter 254 can include an architectural construct, as described in U.S. patent application Ser. No. 13/027,214, entitled "ARCHITECTURAL CONSTRUCT HAVING FOR EXAMPLE A PLURALITY OF ARCHITECTURAL CRYSTALS," filed Feb. 14, 2011, concurrently herewith, the disclosure of which is incorporated herein by reference in its entirety. In another embodiment, the filter 254 can include zeolite, clays (e.g., calcines), and/or other natural minerals. In further embodiments, the filter 254 can include mica, ceramics, patterned metallurgy (e.g., diffusion-bonded metallic particles), and/or other man-made materials. In yet further embodiments, the filter 254 can also include natural materials (e.g., diatomaceous earth) that are milled and/or packaged.

Semi-permeable membranes suitable for the filter 254 can include proton exchange membranes of the types used for electrolysis and/or fuel cell applications. Utilizing such a membrane, a process called "selective ion filtration technology" can be performed. For example, as shown in FIG. 3, hydrogen is ionized on the first or interior surface 252 for entry and transport in the filter 254 as an ion by application of a bias voltage to the filter 254. Optionally, a catalyst may be coated on the filter 254 for increasing the reaction rates. Suitable catalysts include platinum or alloys, such as platinum-iridium, platinum palladium, platinum-tin-rhodium alloys and catalysts developed for fuel cell applications in which hydrocarbon fuels are used.

The exterior surface 256 may include conductive tin oxide (not shown) or a screen of stainless steel can be attached to the bare end of an insulated lead from a controller 270 to facilitate electron removal from the ionized hydrogen. Electrons circuited by another insulated lead as shown to the outside surface of the filter 254 by the controller 270 can be returned to hydrogen ions reaching the outside of the filter 254 by the coated tin oxide or the stainless steel screen that also serves as a pressure arrestment reinforcement and electron distributor.

Electrons taken from the hydrogen during ionization are conducted to the exterior surface 256 of the filter 254. On the "filtered hydrogen" side 256 of the filter 254, electrons recombine with hydrogen ions and form hydrogen atoms that in turn form diatomic hydrogen that pressurizes an annular region 264. The energy required for such selective-ion filtration and hydrogen pressurization can be much less than the pumping energy required by other separation and pressurization processes. The controller 270 maintains the bias voltage as needed to provide hydrogen delivery at a desired pressure at a port 266. Bias voltage generally in the range of 0.2 to 6 volts is needed depending upon the polarization and ohmic losses in developing and transporting hydrogen ions along with pressurization of the hydrogen delivered to the annular region 264.

In other embodiments, the filter 254 can also include a hybrid sieve/membrane. For example, in one embodiment, the filter 254 can include a sieve followed by an ionic membrane. In such an embodiment, the sieve can first extract a particular diatomic and/or other types of molecule (e.g., hydrogen) from the mixture, and then the ionic membrane may extract a particular output (e.g., hydrogen or water and electricity). In other embodiments, the filter 254 can include additional sieves and/or membranes.

In yet other embodiments, the filter 254 can include capillary structures. For example, the filter 254 can include cellulosic and/or other types of organic/inorganic fibers and materials. In another example, architectural construct, described above may be formed to have capillary functions. In yet another example, such capillary structures may be combined with the sieves and/or membranes discussed above.

In further embodiments, the filter 254 can include features that are generally similar in structure and function to the corresponding features of electrolyzer assemblies disclosed in U.S. patent application Ser. No. 12/707,651, filed Feb. 17, 2010, entitled "ELECTROLYZER AND ENERGY INDEPENDENT TECHNOLOGIES"; U.S. patent application Ser. No. 12/707,653, filed Feb. 17, 2010, and entitled "APPARATUS AND METHOD FOR CONTROLLING NUCLEATION DURING ELECTROLYSIS"; and U.S. patent application Ser. No. 12/707,656, filed Feb. 17, 2010, and entitled "APPARATUS AND METHOD FOR GAS CAPTURE DURING ELECTROLYSIS," each of which is incorporated herein by reference in its entirety.

The filter 254 may have a selectivity determined at least in part based on the type of structure of the filter 254 (e.g., arrangement, distribution, alignment of components of the filter 254), environmental factors (e.g., electrical input, ultrasonic drivers, optical drivers, centrifugal drivers, and thermal conditions), additional reactants (e.g., oxygen) to the extraction target material, concentration of the extraction target material in the mixture, and/or a target rate of extraction. In other embodiments, the selectivity may also be determined by other suitable factors.

Various examples of the mixtures, additional reactants, filter types, catalysts, downstream reactions, and tuning parameters are listed in the table below. These examples are listed for the purpose of illustration, and the current technology can also include embodiments with additional and/or different combinations of the foregoing components and/or parameters.

| Mixture | Additional reactants | Filter | Catalyst | Downstream Reaction | Tuning Parameter |
|---|---|---|---|---|---|
| $H_2 + CH_4$ | $O_2$ (or one of $Cl_2$, $Br_2$, $F_2$, S) | Architectural construct (neat or suspended) (electrically tunable) Ionic membrane (e.g., polyamines) Pattern metallurgy sieve | Rare earth metals Nickel Platinum | $H_2 + O_2 \rightarrow H_2O$ + heat | Ultrasonic and/or optical inputs may be used to improve filter transport; membranes may be turned with electrical bias |
| $H_2 + CH_4 + H_2O$ | | Hydrophobic sieve, followed by one of the options above to select hydrogen | | | |
| $H_2 + H_2S$ | | Sieve pre-processing followed by one of the options above to select hydrogen | | | |

Figures 4, 5A:
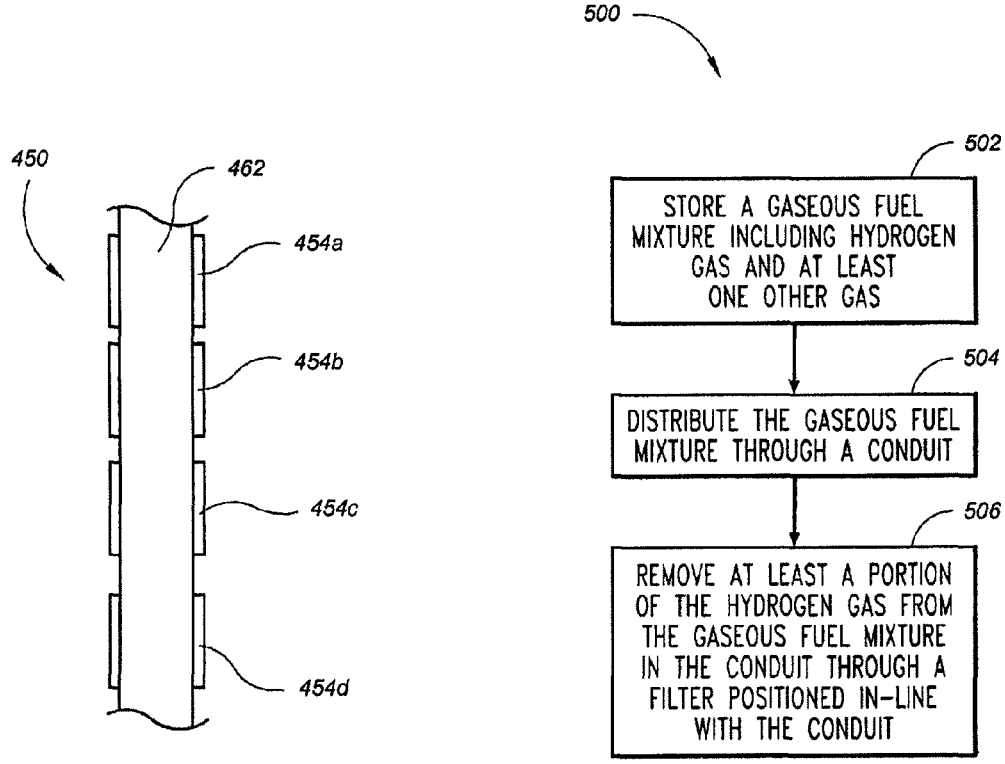
FIG. 4 is a schematic cross-sectional view of an in-line extraction assembly suitable for use in the delivery system of FIG. 1 in accordance with aspects of the technology.
FIGS. 5A and 5B are flowcharts of a method of supplying a chemical in accordance with aspects of the technology.

FIG. 4 is a schematic diagram of an in-line extraction assembly 450 configured in accordance with another embodiment of the technology. In the illustrated embodiment, the assembly 450 includes multiple electrolyzers or filters 454 (shown schematically and identified individually as first through fourth filters 454a-454d) positioned in line with a conduit 462. In certain embodiments, the conduit 462 can be a natural gas conduit, such as natural gas conduit in a preexisting network of natural gas conduits, a water conduit, and/or other suitable types of conduit. Moreover, the filters 454 can be configured to remove hydrogen that has been added to the natural gas in the conduit 462 for different purposes or end results. For example, each of the filters 454 can include any of the features described above with reference to the filter 254 of FIGS. 2 and 3, including, for example, corresponding electrolyzer electrodes. Furthermore, although four filters 454 are shown in FIG. 4, the separation of these filters 454 as individual spaced-apart filters is for purposes of illustration. For example, although the filters 454 may provide different outcomes or functions as described in detail below, in other embodiments the filters 454 can be combined into a single filter assembly.

As noted above, the filters 454 are schematically illustrated as separate filters for selectively filtering hydrogen for one or more purposes. In one embodiment, for example, the first filter 454*a* can be a hydrogen filter that removes hydrogen from a gaseous fuel mixture in the conduit 462 that includes hydrogen and at least one other gas, such as natural gas. The first filter 454*a* can accordingly remove a portion of the hydrogen (e.g., by ion exchange and/or sorption including adsorption and absorption) from the fuel-mixture for the purpose of providing the hydrogen as a fuel to one or more fuel consuming devices. The second filter 454*b* can be configured to produce electricity when removing the hydrogen from the gaseous fuel mixture. For example, as the hydrogen ions pass through the second filter 454*b*, electrons pass to the electron-deficient side of the second filter 454*b* (e.g., a side of the second filter 454*b* exposed to oxygen or another oxidant and opposite the side of the gaseous fuel mixture). The third filter 454*c* can be used to provide water as an outcome of filtering the hydrogen from the gaseous fuel mixture. Moreover, the fourth filter 454*d* can be used to filter hydrogen from the gaseous fuel mixture and to combine the filtered hydrogen with one or more other stored fuels to create an enriched or Hyboost fuel source. For example, the filtered hydrogen can be added to a reservoir of existing gas fuels.

Although the filters 454 of the illustrated embodiment are shown as separate filters, in other embodiments any of the functions of the first through fourth filters 454*a*-454*d* (e.g., providing hydrogen, providing electricity, providing water, and/or providing an enriched fuel source) can be accomplished by a single filter assembly 454. The illustrated embodiment accordingly provides for the storage and transport of hydrogen mixed with at least natural gas using existing natural gas lines and networks. The filters 454 as described herein accordingly provide for filtering or otherwise removing at least a portion of the hydrogen for specific purposes.

FIG. 5A is a process flow diagram of a method or process 500 configured in accordance with an embodiment of the disclosure. In the illustrated embodiment, the process 500 includes storing a gaseous fuel mixture including hydrogen and at least one other gas (block 502). In one embodiment, for example, the hydrogen can make up approximately 20% or less of the gaseous fuel mixture. In other embodiments, however, the natural gas can be greater than or less than approximately 20% of the gaseous fuel mixture. The process 500 further includes distributing the gaseous fuel mixture through a conduit (block 504). In certain embodiments, the conduit can be a natural gas conduit, such as a conventional or pre-existing natural gas conduit as used to distribute natural gas for residential, commercial, and/or other purposes. In other embodiments, however, the conduit can be other types of conduit suitable for distributing the gaseous fuel mixture.

Figure 5B:
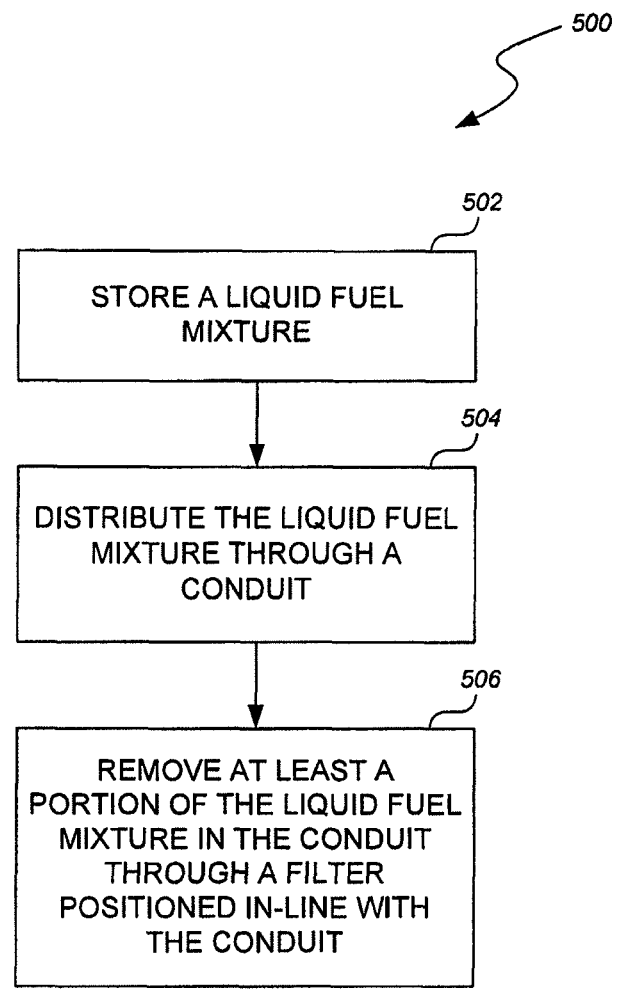

The process 500 further includes removing at least a portion of the hydrogen from the gaseous fuel mixture (block 506). Removing at least a portion of the hydrogen can include removing the hydrogen from the conduit through a filter positioned in line with the conduit. For example, the filter can be a filter generally similar in structure and function to any of the filters described above with reference to FIGS. 2-4. The process of removing the hydrogen can be used to provide the hydrogen as a fuel to a fuel-consuming device, produce electricity, produce water, and/or or produce hydrogen for combination with one or more other fuels to produce an enriched fuel mixture. Even though FIG. 5A shows the method 500 described with respect to a gaseous fuel, in other embodiments, as shown in FIG. 5B, the method 500 can be applied to a liquid fuel as well. In further embodiments, the method 500 can be applied to a mixture of liquid and gas fuels.

Figure 6:
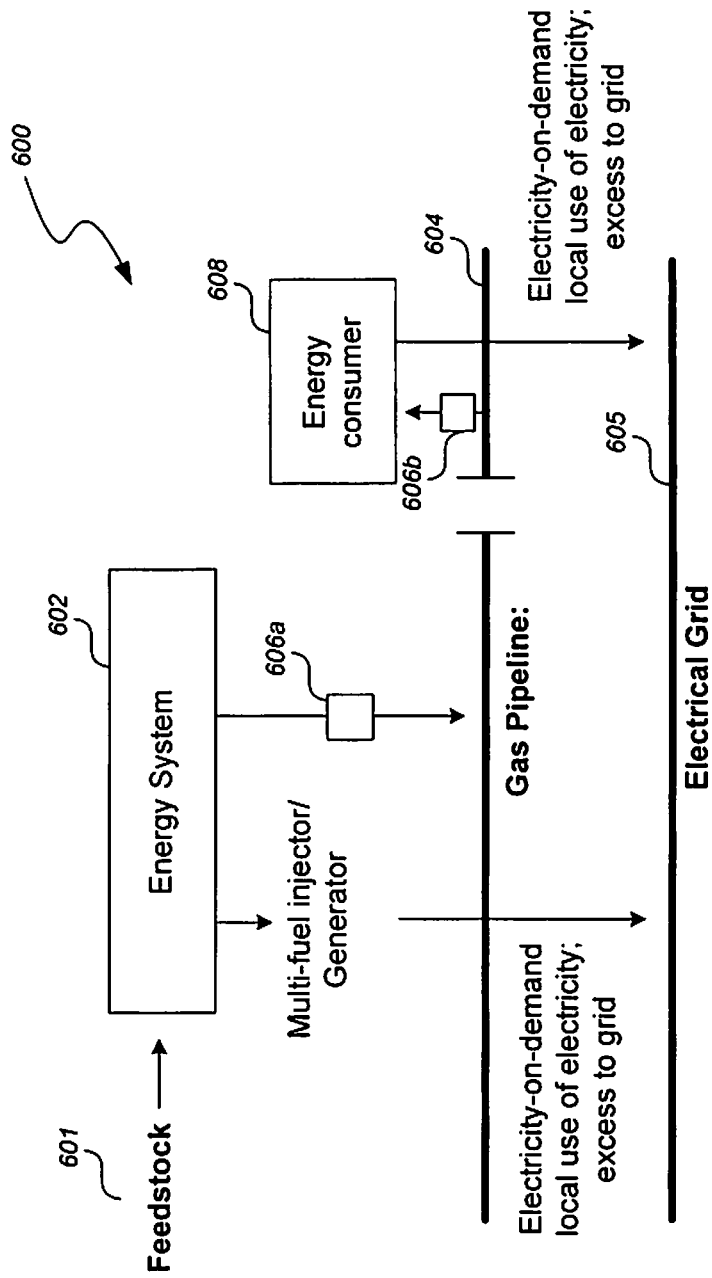
FIG. 6 is a schematic block diagram of an energy generation/delivery system in accordance with aspects of the technology.

FIG. 6 is a schematic block diagram of an energy generation/delivery system 600 in accordance with aspects of the technology. As shown in FIG. 6, the energy generation/delivery system 600 can include an energy system 602, a pipeline 604, an electrical grid 605, an input in-line extraction device 606*a*, an output in-line extraction device 606*b*, and an energy consumer 608 operatively coupled to one another. In one embodiment, the energy system 602 can include a waste water to energy system. In other embodiments, the energy system 602 can include other suitable energy generating systems. In the illustrated embodiment, the pipeline 604 includes a gas pipeline (e.g., a natural gas pipeline). In other embodiments, the pipeline 604 can also include a liquid pipeline and/or a two-phase pipeline. The input and output in-line extraction devices 606*a* and 606*b* can be generally similar to the in-line extraction device 106 (FIG. 1) in structure and in function. The energy consumer 608 can include a caterpillar natural gas turbine and/or other suitable devices that can consume the energy delivered via the pipeline 604.

In operation, the energy system 602 receives a feedstock 601 (e.g., a biomass, natural gas, etc.) and converts the feedstock 601 into a mixture of compositions. The energy generated during the conversion is consumed locally and/or fed to the electrical grid 605. The input in-line extraction device 606*a* then selectively extracts a first target composition (e.g., a combination of methane and hydrogen and/or other suitable compositions) and supply the extracted first target composition to the pipeline 604.

The output in-line extraction device 606*b* then selectively extracts a second target composition and supply the extracted second composition to the energy consumer 608. The second target composition can be generally similar to or different from the first target composition. For example, in one embodiment, the second target composition can include methane and hydrogen. In another embodiment, the second target composition can include methane or hydrogen. In further embodiments, the second target composition can include other suitable materials. The energy consumer 608 can then convert the extracted second composition into useful energy (e.g., electricity), which may be consumed locally and/or supplied to the electrical grid 605.

Even though only one input/output in-line extraction device 606*a*/606*b* is shown in FIG. 6, in other embodiments, multiple input/output in-line extraction devices 606*a*/606*b* can be located at various locations along the pipeline 604. Optionally, in certain embodiments, the energy generation/delivery system 600 can also include a metering system (not shown) coupled to at least some of the input/output in-line extraction devices 606*a*/606*b* for measuring a quantity of materials produced, transferred, and withdrawn from the pipeline 604. One suitable metering system is described in U.S. patent application Ser. No. 13/027,188, entitled "METHODS, DEVICES, AND SYSTEMS FOR DETECTING PROPERTIES OF TARGET SAMPLES," filed Feb. 14, 2011, concurrently herewith, the disclosure of which is incorporated herein in its entirety. In other embodiments, the metering system can also be configured for monitoring and controlling a pressure, a composition, a temperature, and/or other suitable operating parameters of the material in the pipeline 604 at different points. By monitoring and/or controlling such operating parameters, the economics of the "wheeling" stations, pumping stations, hubs, market hubs, and market centers can be enhanced by quantity, pressure, and timing when compared to conventional techniques.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications can be modified to provide yet further embodiments of the disclosure.

These and other changes can be made to the disclosure in light of the above detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. A method of extracting a target material from a mixture in an industrial pipeline delivery conduit, the method comprising:
   selecting an in-line extraction device having a target permeability based on a characteristic of the target material;
   selectively removing at least a portion of the target material from the mixture in the delivery conduit using the in-line extraction device, the in-line extraction device having a first side in contact with the mixture in the delivery conduit and a second side opposite the first side; and
   collecting the target material removed by the in-line extraction device and supplying the collected target material to a downstream facility.

2. The method of claim 1 wherein:
   the mixture includes hydrogen ($H_2$) and at least one of methane ($CH_4$), ethane ($C_2H_6$), propane ($C_3H_8$), water ($H_2O$), carbon monoxide (CO), carbon dioxide ($CO_2$), nitrogen ($N_2$), oxygen ($O_2$), argon (Ar), and hydrogen sulfide ($H_2S$);
   the target material includes hydrogen; and
   selecting an in-line extraction device includes selecting a proton permeable membrane based on a permeability of hydrogen.

3. The method of claim 1 wherein selecting an in-line extraction device includes selecting an in-line extraction device based on at least one of a concentration of the target material in the mixture and a rate of extraction of the target material.

4. The method of claim 1 wherein:
   the method further includes providing a reactant to the second side of the in-line extraction device; and
   selecting an in-line extraction device includes selecting an in-line extraction device having a catalyst based on the provided reactant.

5. The method of claim 1 wherein:
   the mixture includes hydrogen ($H_2$) and at least one of methane ($CH_4$), ethane ($C_2H_6$), propane ($C_3H_8$), water ($H_2O$), carbon monoxide (CO), carbon dioxide ($CO_2$), nitrogen ($N_2$), oxygen ($O_2$), argon (Ar), and hydrogen sulfide ($H_2S$);
   the target material includes hydrogen;
   selecting an in-line extraction device includes selecting a proton permeable membrane based on a permeability of hydrogen;
   the method further includes providing oxygen to the second side of the proton permeable membrane; and
   selecting an in-line extraction device includes selecting a proton permeable membrane having a catalyst containing at least one of palladium, nickel, platinum and a rare earth metal.

6. The method of claim 1 wherein:
   returning the electrons to the target material ions pressurizes a collection region of the in-line extraction device with the target material.

7. The method of claim 1 wherein:
   the mixture is presented to the delivery conduit as an unseparated material stream from a natural gas facility.

8. The method of claim 7 wherein:
   the unseparated material stream includes at least one of methane ($CH_4$), ethane ($C_2H_6$), propane ($C_3H_8$).

9. The method of claim 1 wherein:
   the mixture is presented to the delivery conduit as an unseparated material stream from a pyrolysis facility that produces the material stream at least in part by converting biomass into a synthetic natural gas.

10. The method of claim 9 wherein:
    the unseparated material stream includes hydrogen ($H_2$), carbon monoxide (CO), and carbon dioxide ($CO_2$).

11. The method of claim 1 wherein:
    the target material is selected using a controller that is operatively coupled with the in-line extraction device.

12. The method of claim 1 wherein:
    a rate at which the target material is extracted from the mixture is selected using a controller that is operatively coupled with the in-line extraction device.

13. The method of claim 1 wherein:
    a pressure of the target material is controlled using a controller and metering system that are operatively coupled with the in-line extraction device.

14. The method of claim 1 wherein:
    a temperature of the target material is controlled using a controller and metering system that are operatively coupled with the in-line extraction device.

* * * * *

UNITED STATES PATENT AND TRADEMARK OFFICE
CERTIFICATE OF CORRECTION

PATENT NO. : 8,814,983 B2  
APPLICATION NO. : 13/682668  
DATED : August 26, 2014  
INVENTOR(S) : Roy Edward McAlister Page 1 of 1

It is certified that error appears in the above-identified patent and that said Letters Patent is hereby corrected as shown below:

On the title page, item (57), in "ABSTRACT", in column 2, line 9, Delete "delivery" and insert -- deliver --, therefor.

On title page 2, under "Related U.S. Application Data", in column 1, line 1, Delete "and" and insert -- which --, therefor.

On title page 2, under "Related U.S. Application Data", in column 1, line 44, Delete "12/857,443," and insert -- 12/857,433, --, therefor.

On title page 3, References cited, under "OTHER PUBLICATIONS", in column 2, line 1, Delete "Enviromental" and insert -- Environmental --, therefor.

On title page 3, References cited, under "OTHER PUBLICATIONS", in column 2, line 42, Delete "Hyway" and insert -- Highway --, therefor.

Signed and Sealed this  
Thirteenth Day of January, 2015

Michelle K. Lee  
*Deputy Director of the United States Patent and Trademark Office*